United States Patent
Gurol

[15] 3,654,444
[45] Apr. 4, 1972

[54] ADAPTIVE CONTROLLER
[72] Inventor: Ismail Macit Gurol, Farmington, Mich.
[73] Assignee: GSE, Incorporated, Detroit, Mich.
[22] Filed: Dec. 4, 1969
[21] Appl. No.: 882,133

[52] U.S. Cl. .................235/151.1, 235/150.1, 235/193, 235/195, 318/637, 328/73, 328/151
[51] Int. Cl. ........................................................G06g 7/66
[58] Field of Search ..............235/150, 150.1, 151, 151.1; 318/609, 610, 611, 615–617, 636, 637

[56] References Cited

UNITED STATES PATENTS 3,419,772  12/1968  Ross.........................235/151.1 X
3,089,643  5/1963  Idzerda et al. ...............235/151.1 X
3,149,270  9/1964  Smyth et al. .................235/150.1 X
3,458,821  7/1969  Clarridge ....................235/151.1 X
3,512,140  5/1970  Yokozawa et al. ..............235/183

Primary Examiner—Malcolm A. Morrison
Assistant Examiner—Felix D. Gruber
Attorney—McGlynn & Reising

[57] ABSTRACT

Adaptive control circuit including an input portion for deriving a discontinuous error signal representing the difference between a monitored value and a set point, means for transferring a portion of the error from one of two isolated terminal points to the other, and a multiplier for restoring the transferred signal to the untransferred level.

10 Claims, 1 Drawing Figure

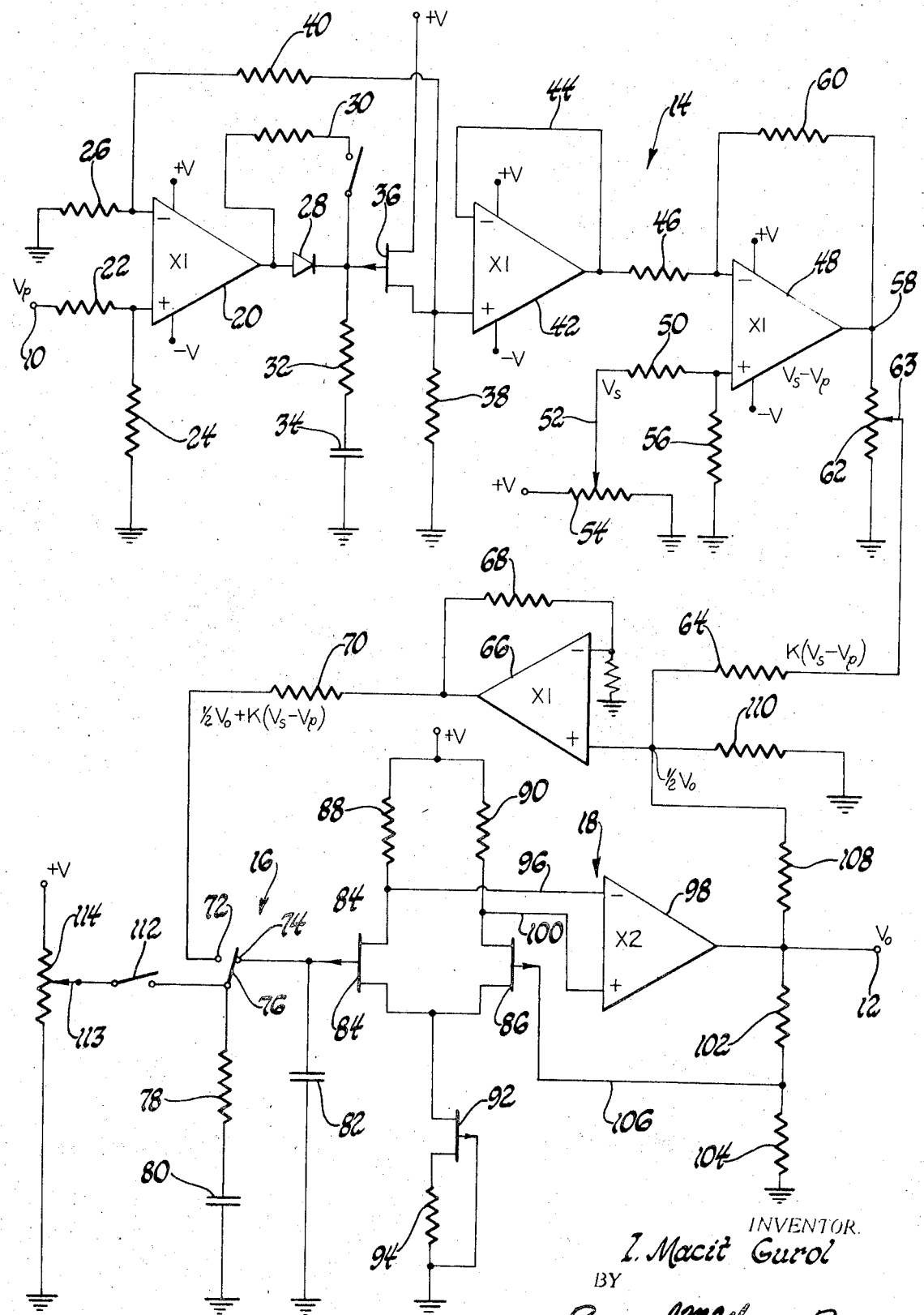

ADAPTIVE CONTROLLER

This invention relates to adaptive control circuits and more particularly to an adaptive control circuit which is responsive to a discontinuous or periodically occurring signal.

The term "adaptive control circuit", as used herein, refers to circuit devices having an input signal which is representative of a monitored quantity and an output signal which is used in controlling that monitored quantity but in which other variables may also affect the monitored quantity and in which there is no closed-loop feedback control. As a general category, such circuit devices are well known.

The subject invention is an improvement in the field of adaptive control circuit devices and is particularly applicable to the reception of signals representing discontinuous or periodically occurring quantities such as one finds generated in a cyclically operating machine or process. In accordance with the invention, the subject circuit is capable of transferring a control signal quantity between electrically isolated terminal points without a loss of character therein due to the transfer and without responding to or being reduced in effectuality by the discontinuous or periodic nature of the monitored signal. Generally stated, this is accomplished by storage means for receiving the control signal quantity from one of the two electrically isolated terminal points and selectively transferring a predetermined portion of the signal quantity to the other of the terminal points together with restoring means such as a signal amplitude multiplier for restoring a predetermined quantity to the transferred signal portion for application to an output point.

In a preferred embodiment of the invention, a first signal representing a discontinuous monitored quantity is compared to a second signal representing a desired set point to derive a control signal quantity which is applied to one of two electrically isolated terminal points between the comparator and the output of the illustrative circuit. A selectively operable switch connected to a first voltage amplitude storage device such as a capacitor is operable between two positions, one in which the storage device receives a selected portion of the control signal quantity, and the other in which a selected portion of the stored signal is transferred to a second storage device such as a capacitor. The second storage device is connected to apply an input to a multiplier device which restores the transferred signal portion to the level of the untransferred signal and applies the result to an output for control purposes. In addition, a selected portion of the output signal is combined with the difference signal which, in turn, is made available for transfer at the first of the two electrically isolated terminal points. Accordingly, the circuit is capable of responding to a discontinuous input signal quantity to generate in an adaptive fashion a control signal output which may be set to a new value at will and which will take effect upon the next circuit response to the discontinuous input signal.

The invention, as well as the various features and advantages thereof, will be best understood from a reading of the following specification which describes an illustrative embodiment of the invention. This specification is to be taken with the accompanying single FIGURE drawing which illustrates the embodiment in schematic detail.

Referring to the single FIGURE the illustrative embodiment is an adaptive control circuit having an input 10 which is adapted to receive a discontinuous or periodically occurring signal quantity $V_p$ and an output 12 upon which appears a control signal $V_0$ which may be applied to a suitable instrumentality for control purposes. As an illustrative example, the circuit may be applied to the the adaptive control of the pressure in an injection molding machine wherein a suitable pressure responsive transducer is employed to generate the input signal $V_p$ and a suitable hydraulic pressure controller is operatively connected to receive the output signal $V_0$.

Between the input 10 and the output 12 the illustrated circuit includes input means 14 for deriving a control signal quantity, storage means 16 for selectively transferring a predetermined portion of the control signal quantity from a first terminal point 72 to a second terminal point 74 which is electrically isolated therefrom. The subject circuit further includes a signal restoring means 18 for restoring the transferred signal portion to the previously untransferred level and applying that restored signal to the output 12.

Considering the circuit in greater detail, the input means 14 is shown to comprise a peak recording amplifier 20 having a positive input connected to the input terminal 10 through a resistor 22. A second transistor 24 is connected between the positive input terminal and ground to form a positive input signal voltage quantity. The negative input of amplifier 20 is grounded through a resistor 26. The output of amplifier 20 is connected through a diode 28 having a selectively operable shunt circuit 30. The cathode of the diode 28 is connected to ground through a storage circuit comprising a resistor 32 and a peak signal storage capacitor 34. The cathode of diode 28 is also connected to the gate electrode of a field effect transistor 36 which forms a high-input impedance coupling to a buffer amplifier 42. To accomplish this connection, the field effect transistor 36 which is suitably supplied with voltage from a source as indicated, is grounded through a bias resistor 38 to apply a signal to the positive input of the amplifier 42. That same grounded terminal is connected back to the negative input of amplifier 20 through a feedback resistor 40 which gives the amplifier 20 an overall unity gain.

Buffer amplifier 42 is also connected so as to exhibit a unity gain by means of a feedback circuit 44 which is connected from the output to the negative input as indicated. The output of amplifier 42 is connected through a series resistor 46 to the negative input of an operational amplifier 48 which is connected to operate as a difference amplifier as will be more fully explained directly.

The positive input of amplifier 48 is connected through a bias resistor 50 to the movable wiper 52 of a set point voltage potentiometer which includes a resistor 54 having one end grounded and the other end connected to a suitable voltage source as indicated. The resistor 50, as indicated, is connected to the positive input of amplifier 48 and also to ground through a resistor 56 to complete the set point of voltage generating apparatus. This apparatus is effective to generate a selectively variable amplitude set point signal $V_s$ which represents the controlled quantity level which is desired. In the previously given example of an injection molding machine, the set point signal $V_s$ may be taken to represent the cyclically repeatable injection pressure which is to be generated in the machine.

The amplifier 48 in receiving the buffered peak amplitude of the input signal $V_p$ on the negative input and the set point voltage $V_s$ on the positive input is effective to produce on output 58 a difference signal equal to the voltage amplitude difference between $V_s$ and $V_p$. Unity gain for the amplifier 48 is accomplished by means of a feedback resistor 60 which is connected between the output point 58 and the negative input.

The output or difference signal $V_s-V_p$ appearing on amplifier output 58 is applied across a resistor 62 having a wiper 63 and which operates as a potentiometer to select any given fraction of the difference voltage and apply that fraction through a resistor 64 to the positive input of an amplifier 66. The fraction of the difference signal which is selected by the position of wiper 63 is represented in the FIGURE by the constant K. The DC amplifier 66 is a unity gain amplifier having a feedback resistor 68 connected from the output to the negative input and is effective to produce a DC output signal corresponding to the sum of the signals applied to the positive input thereof. These signals include not only the error signal K $(V_s-V_p)$ but also a feedback signal ½ $V_0$ as will be subsequently described.

The output of the unity gain amplifier 66 is applied through a resistor 70 to the first terminal point 72 which, as previously indicated, is adjacent but electrically isolated from a second terminal point 74. The signal storage and transfer means 16 includes a selectively operable switch 76 which is positionable between and in individual contact with the terminal points 72 and 74. Although switch 76 is shown as a manual type, it is to be understood that the user may find it advantageous to employ an electronic or relay controlled switch synchronized to the operating cycles of the controlled quantity. Switch 76 is electrically connected to ground through the series combination of a resistor 78 and a first storage capacitor 80. Accordingly, the output signal ½ $V_0$ + K ($V_s$−$V_p$) from the amplifier 66 is applied across the capacitor 80 when the switch 76 is positioned in contact with the first terminal point 72.

After the charge across capacitor 80 has been produced, switch 76 is moved to the position contacting terminal point 74 wherein the capacitor 80 and resistor 78 are connected in series with a second storage capacitor 82. This causes a momentary charge transfer and current flow until the voltage across capacitor 80 equals the voltage on capacitor 82 and the ratio of the charges is equal to the ratio of the capacitive valves. Accordingly, the effect of the charge transfer is to cause one-half of the signal voltage stored in capacitor 80 to be transferred to capacitor 82.

The signal voltage portion which is transferred by switch 76 to the capacitor 82 is also applied to the input of a high impedance differential amplifier which comprises the field effect transistors 84 and 86. These transistors are connected commonly through one electrode to a voltage source as indicated by means of series bias resistors 88 and 90, respectively. The other electrodes of field effect transistors 84 and 86 are connected through a third field effect transistor 92 and a resistor 94 to ground as indicated for overall bias control purposes.

The voltage developed across the resistor 88 by conduction of transistor 84 is connected by way of a conductor 96 to the negative input of a DC amplifier 98 which forms part of the restoring means 18 previously introduced. The signal developed across resistor 90 is similarly connected through a conductor 100 to the positive input of amplifier 98. Amplifier 98 has an overall gain characteristic of 2 so as to produce an output signal $V_0$ on output 12 which represents the full value of the untransferred signal appearing on terminal point 72. In other words, after one-half of the untransferred signal voltage is transferred to the capacitor 82, the restoring means 18 multiplies the signal by two to restore it to its original value.

The output signal $V_0$ of amplifier 98 is applied across a voltage divider comprising two equal resistors 102 and 104. The junction between the two resistors is connected back to the control electrode of field effect transistor 86 by means of a feedback conductor 106 to produce the gain of 2 in the amplifier 98.

The output signal $V_0$ from amplifier 98 is also fed in fractional form to the positive input of the DC amplifier 66 by means of equal value resistors 108 and 110. The junction between the two resistors is connected to the positive input of amplifier 66 along with the fraction of the control signal quantity which is obtained from the potentiometer resistor 62. This signal constituent completes the input expression ½ $V_0$ + K($V_s$−VBp) for the amplifier 66.

For initialization purposes, the switch 76 is connected through a two-position switch 112 to a wiper 113 which is adjustably engageable with a potentiometer resistor 114 having a suitable voltage supply as indicated. Any selected fraction of the initialization voltage source may be selected by the position of the wiper 113 so as to apply an initial charge to the capacitor 80 upon start up.

Although the operation of the circuit illustrated in the FIGURE is believed to be apparent from the foregoing description, a brief specific description of operation will now be given.

The discontinuous or periodic signal $V_p$ applied to input 10 is tracked by the amplifier 20 and the peak thereof is indicated by the charge accumulated across the capacitor 34. This peak signal is applied to the buffer amplifier 42 to the negative input of the difference amplifier 48. The set point signal $V_s$ is applied to the positive input of amplifier 48 such that a different signal $V_s$−$V_p$ appears on the amplifier output 58. Assuming the set point potentiometer comprising wiper 52 and resistor 54 is adjusted between cycles of the monitored quantity to a new and higher value, the error signal $V_s$−$V_p$ is a positive quantity in the form of a DC voltage amplitude. The portion or fraction K of this voltage amplitude selected by the position of the potentiometer wiper 63 on resistor 62 is introduced into the positive input of amplifier 66 along with one-half of the previous output signal voltage $V_0$. The sum which is produced by amplifier 66 is applied to the first terminal point 72. In synchronism with the discontinuous input signal $V_p$ the switch 76 is placed in contact with terminal point 72 to store the signal ½ $V_0$+K($V_s$−$V_p$) across the capacitor 80. The switch 76 is then shifted such that one-half of this quantity is transferred across to capacitor 82. This transferred signal portion is then restored to full untransferred value by the multiplier amplifier 98 and applied to the output 12. Accordingly, the circuit shown in the FIGURE adjusts the output signal level to a new value between the generation of input signals and approaches the new value at a rate which is selectively determinable by the the adjustment of the constant K.

It will be apparent to those skilled in the art that various modifications may be made to the illustrated embodiment without departing from the spirit and scope of the invention.

The embodiments of the invention in which an exclusive property or privilege is claimed are defined as follows:

1. An adaptive controller circuit for discontinuous input response comprising: first and second electrically isolated terminal points, input means for applying a control signal quantity to the first of said electrically isolated terminal points, first reactive signal storing means, switch means for intermittently connecting the first signal storing means to receive the control signal quantity through the first terminal point whereby at least a portion of the control signal quantity is stored in the first signal storing means, second reactive signal storing means connected to the second of said terminal points, said switch means being operable to intermittently connect the first signal storing means to the second signal storing means through the second terminal point thereby to effectively transfer at least a portion of the control signal quantity to the second signal storing means, an output, and restoring means connected between said second terminal point and the output for restoring the transferred portion to the untransferred signal level.

2. A circuit as defined in claim 1 wherein the input means comprises means for receiving a first signal related to the value of monitored quantity of a cyclical character, means for receiving a second signal related to a desired control value, and comparator means for deriving the control signal quantity as a function of the difference between the first and second signals.

3. A circuit as defined in claim 2 wherein the input means further includes potentiometer means connected between the comparator means and the first terminal point for selectively varying the fraction of the control signal quantity applied to the first reactive signal storage means.

4. A circuit as defined in claim 1 wherein the storing means is an amplifier having a predetermined gain factor.

5. A circuit as defined in claim 1 wherein the first signal storing means comprises a first capacitor, and the second signal storing means comprises a second capacitor.

6. A circuit as defined in claim 5 including initializing means for selectively applying a charge of selected magnitude to the first reactive signal storing means.

7. A circuit as defined in claim 2 including means for combining a predetermined portion of the signal on said output with the difference between the first and second signals to constitute the control signal quantity.

8. A circuit as defined in claim 2 wherein the input means includes a peak storing amplifier connected to receive the monitored quantity and responsive thereto for deriving the first signal.

9. A circuit as defined in claim 4 including a high impedance stage coupling the storage means to the amplifier means.

10. A circuit as defined in claim 5 wherein the restoring means comprises an amplifier having a gain factor of approximately 2.